US012695010B2

(12) United States Patent
Tsuji et al.

(10) Patent No.: US 12,695,010 B2
(45) Date of Patent: Jul. 28, 2026

(54) THERMISTOR LAYER, ELECTRODE FOR BATTERY, BATTERY, AND THERMISTOR

(71) Applicant: ELIY POWER CO., LTD., Tokyo (JP)

(72) Inventors: Nobuhiro Tsuji, Otsu (JP); Manabu Murata, Otsu (JP); Hisashi Kawakami, Otsu (JP); Yasuto Imai, Otsu (JP); Yoshiro Kojima, Otsu (JP); Takao Fukunaga, Tokyo (JP)

(73) Assignee: ELIY POWER CO., LTD., Tokyo (JP)

( * ) Notice: Subject to any disclaimer, the term of this patent is extended or adjusted under 35 U.S.C. 154(b) by 428 days.

(21) Appl. No.: 18/263,653

(22) PCT Filed: Feb. 1, 2021

(86) PCT No.: PCT/JP2021/003539
§ 371 (c)(1),
(2) Date: Jul. 31, 2023

(87) PCT Pub. No.: WO2022/162940
PCT Pub. Date: Aug. 4, 2022

(65) Prior Publication Data
US 2024/0087777 A1     Mar. 14, 2024

(51) Int. Cl.
*H01C 7/02*          (2006.01)
*H01M 4/60*          (2006.01)
(52) U.S. Cl.
CPC ............. *H01C 7/028* (2013.01); *H01M 4/602* (2013.01)

(58) Field of Classification Search
CPC .......... H01C 7/008; H01C 7/02; H01C 7/021; H01C 7/022; H01C 7/04; H01C 7/041; H01C 7/042
See application file for complete search history.

(56) References Cited

U.S. PATENT DOCUMENTS

| | | | |
|---|---|---|---|
| 2015/0280241 A1 | 10/2015 | Hara et al. | |
| 2015/0303484 A1* | 10/2015 | Iida ........................ | H01G 11/24 |
| | | | 429/233 |
| 2017/0288211 A1* | 10/2017 | Zhamu .................. | H01M 4/386 |
| 2019/0260028 A1* | 8/2019 | Zhamu .................... | H01M 4/62 |

(Continued)

FOREIGN PATENT DOCUMENTS

| | | |
|---|---|---|
| CN | 111758174 A | 10/2020 |
| JP | 2001-028301 A | 1/2001 |

(Continued)

*Primary Examiner* — Kyung S Lee
(74) *Attorney, Agent, or Firm* — Stites & Harbison, PLLC; Jeffrey A. Haeberlin; Collin M. Aycock

(57) ABSTRACT

A thermistor layer of the present invention is configured to be disposed in an electrical current path. The thermistor layer comprises a thermosensitive particle, a plurality of electro-conductive particles covering a surface of the thermosensitive particle, and a binder adhering the electro-conductive particles, the electro-conductive particles form an electro-conductive network, at least the surface of the thermosensitive particle is made of a thermoplastic resin, the thermoplastic resin softens at a temperature lower than a temperature at which the binder softens, and the thermistor layer is provided to become highly resistive due to softening and deformation of the thermoplastic resin.

20 Claims, 3 Drawing Sheets

(56)  References Cited

U.S. PATENT DOCUMENTS

| | | |
|---|---|---|
| 2020/0194795 A1 | 6/2020 | Torita et al. |
| 2020/0313162 A1* | 10/2020 | Zhamu ................. H01M 4/625 |
| 2020/0403276 A1 | 12/2020 | Yamamoto et al. |
| 2021/0043928 A1 | 2/2021 | Yamamoto et al. |
| 2021/0135238 A1 | 5/2021 | Jin et al. |

FOREIGN PATENT DOCUMENTS

| | | | |
|---|---|---|---|
| JP | 2002-008630 A | 1/2002 | |
| WO | 2020/098792 A1 | 5/2020 | |

* cited by examiner

[FIG. 1]
[FIG. 2]
[FIG. 3]
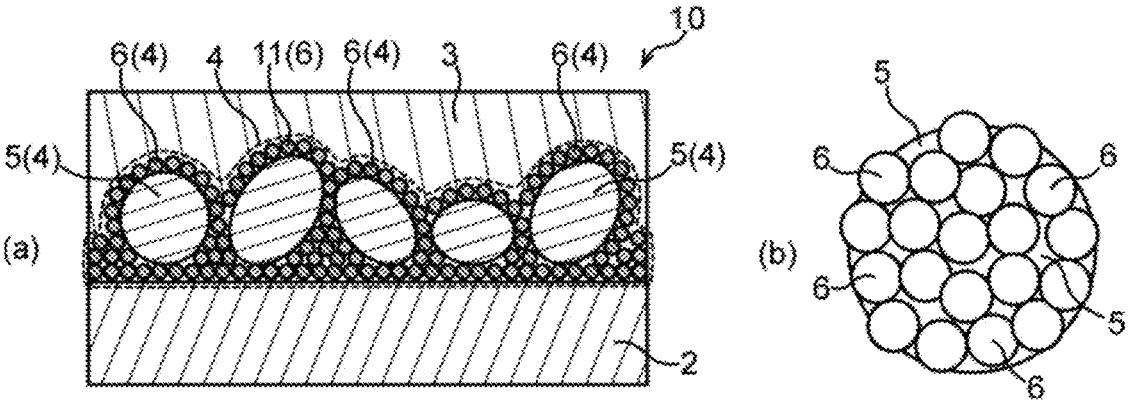
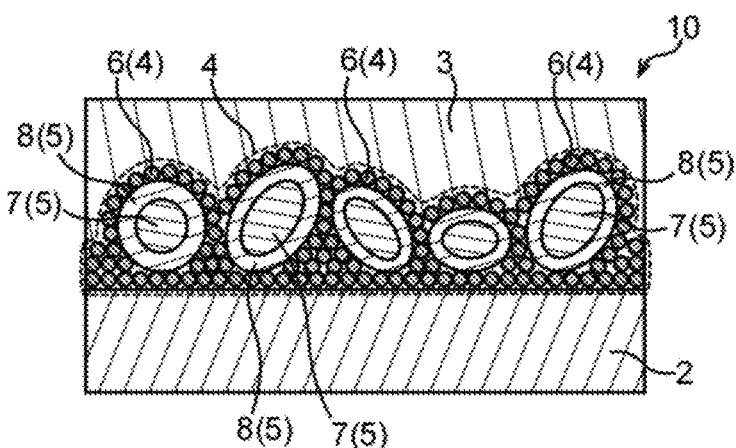

[FIG. 4]
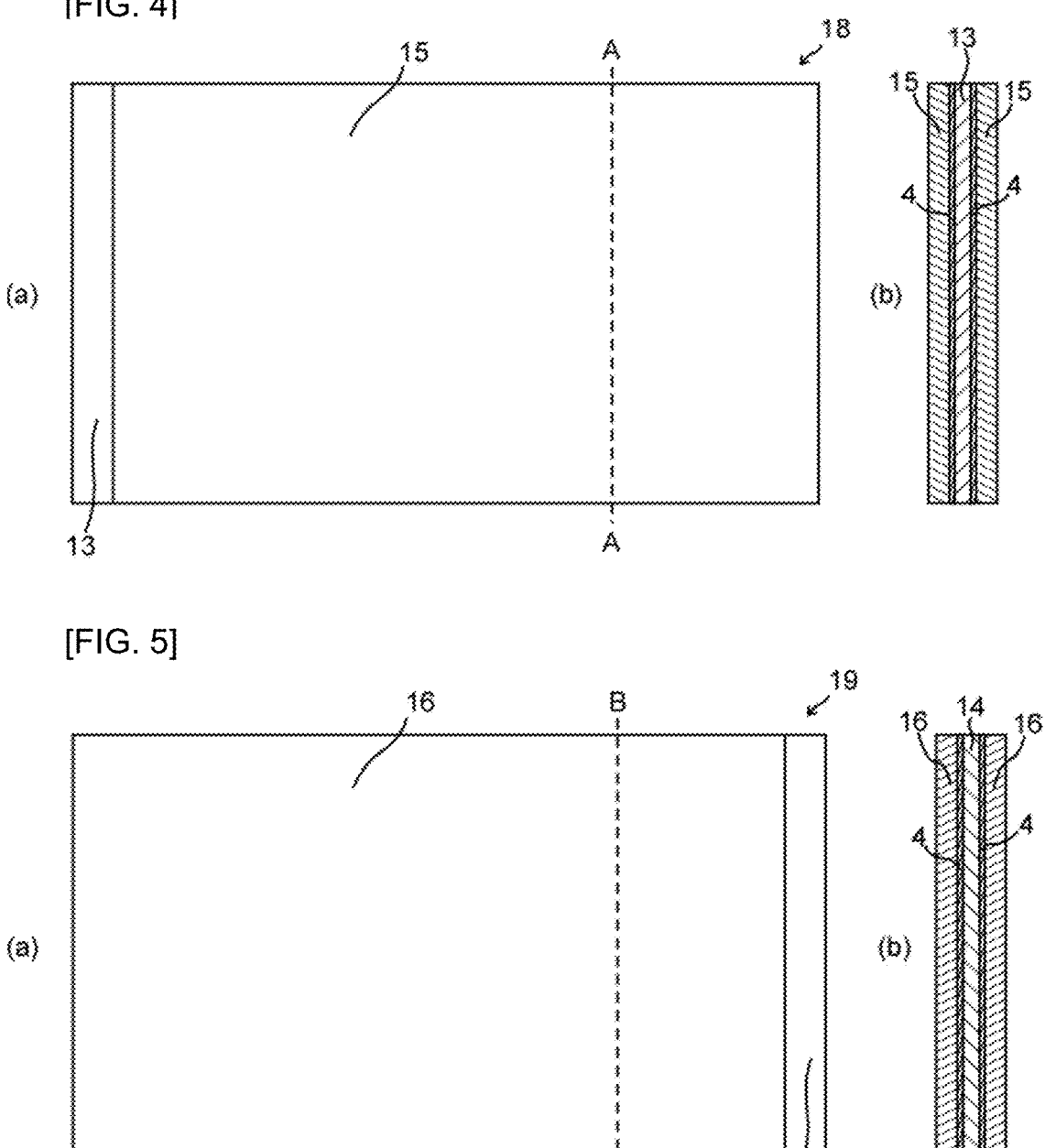
[FIG. 5]

[FIG. 6]
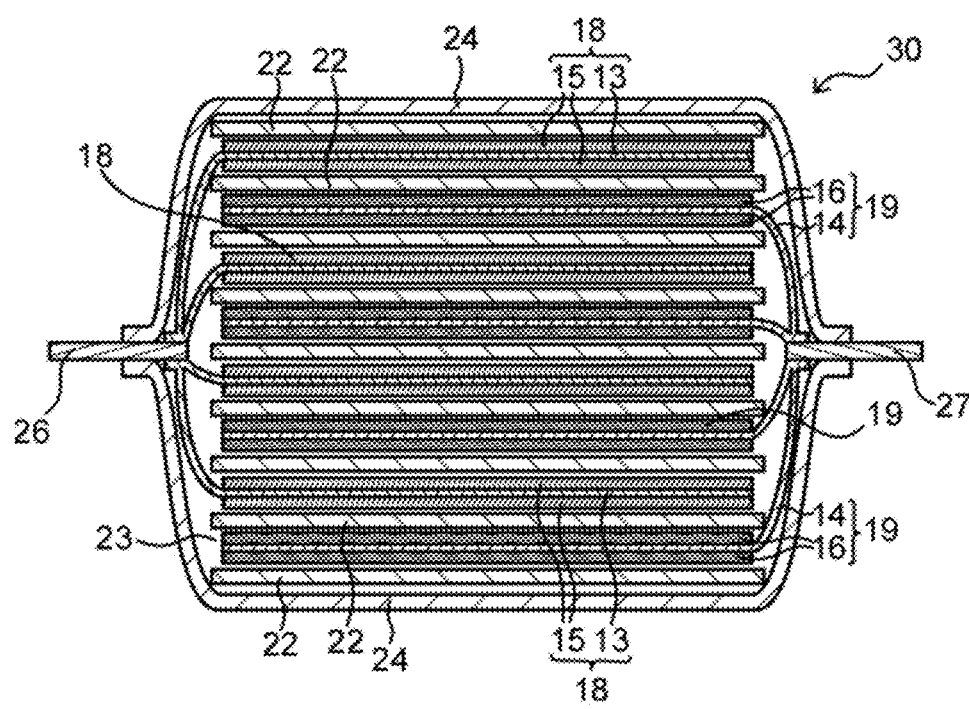
[FIG. 7]
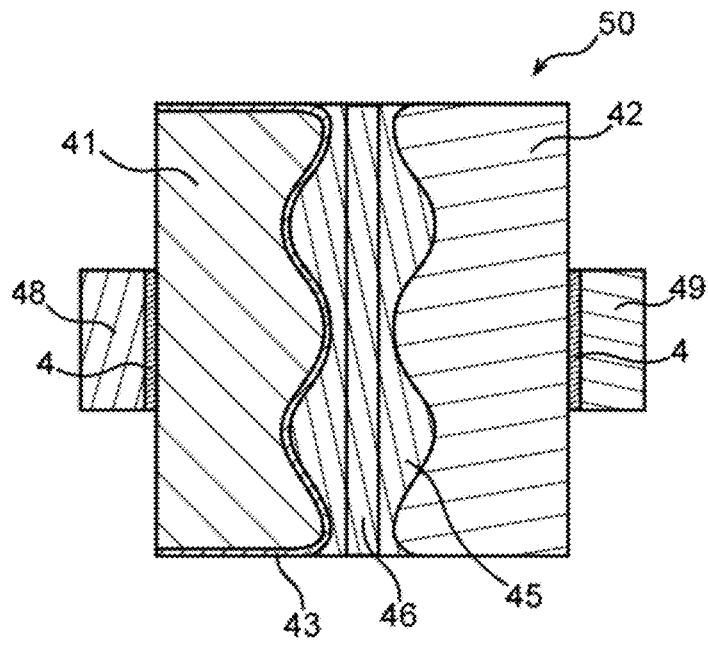

THERMISTOR LAYER, ELECTRODE FOR BATTERY, BATTERY, AND THERMISTOR

TECHNICAL FIELD

The present invention relates to a thermistor layer, an electrode for a battery, a battery, and a thermistor.

BACKGROUND ART

If any failure occurs in electrical equipment or batteries, a current may continue to flow and abnormal heat generation may occur. A PTC thermistor, etc., which becomes highly resistive and reduces a flowing current when such abnormal heat generation occurs is known (for example, see Patent Literature 1). Among the PTC thermistors, a polymer-based PTC thermistor, etc., using an electro-conductive resin layer in which an electro-conductive filler is mixed in a resin layer is known. In addition to thermistors, the electro-conductive resin layer can be also applied to electrodes of batteries, planar heating elements, thermal sensors, etc.

CITATION LIST

Patent Literature

Patent Literature 1: Japan Patent Application KOKAI Publication No. 2001-028301

SUMMARY

Technical Problem

A temperature (switching temperature) at which an electrical resistance of a PTC thermistor rapidly increases is substantially determined by a melting point of a crystalline polymer used. Thus, the degree of freedom in designing the switching temperature is small. In addition, the switching temperature cannot be set lower than the melting point of the crystalline polymer.

The present invention has been made in view of such circumstances, and provides a thermistor layer whose temperature at which resistance is increased can be designed and changed with a high degree of freedom and which has excellent thermistor characteristics.

Solution to Problem

The present invention provides a thermistor layer provided so as to be disposed in an electrical current path. The thermistor layer includes a thermosensitive particle, a plurality of electro-conductive particles covering a surface of the thermosensitive particle, and a binder for adhering the plurality of electro-conductive particles. The plurality of electro-conductive particles form an electro-conductive network, at least the surface of the thermosensitive particle is made of a thermoplastic resin, and the thermoplastic resin has the property of softening at a temperature lower than a temperature at which the binder softens. The thermistor layer is provided to become highly resistive due to softening and deformation of the thermoplastic resin.

Advantageous Effects of Invention

The thermistor layer of the present invention includes a plurality of electro-conductive particles covering the surface of a thermosensitive particle, and the plurality of electro-conductive particles form an electro-conductive network. This electro-conductive network allows the thermistor layer to have excellent conductivity and to be an electrical current path.

A surface layer or entirety of the thermosensitive particle is made of a thermoplastic resin. Thus, when the temperature of the thermistor layer becomes higher than a softening point of the thermoplastic resin, the thermoplastic resin of the surface layer or entirety of the thermosensitive particle is softened and deformed, so that the thermoplastic resin enters pores of the thermistor layer (for example, gap between adjacent electro-conductive particles) or a part of the thermosensitive particle is dented. As a result, the electro-conductive network formed by the plurality of electro-conductive particles on the surface of the thermosensitive particle is changed or broken, causing high resistance of the thermistor layer. Alternatively, if the surface layer or entirety of the thermosensitive particle is softened and deformed, contact points at an interface between the thermistor layer and the electrical current path connected to the thermistor layer are reduced (for example, peeling occurs at an interface between the electro-conductive particles of the thermistor layer and an electro-conductive layer. In addition, for example, the softened thermosensitive resin enters the interface between the electro-conductive particles of the thermistor layer and the electro-conductive layer). Therefore, the electrical resistance at this interface is increased, and the thermistor layer becomes highly resistive.

As such, the high resistance of the thermistor layer can reduce the current flowing through the electrical current path and suppress abnormal heat generation. Accordingly, the thermistor layer of the present invention can be utilized as an overheat protection structure. Further, since the thermistor layer becomes highly resistive at a temperature at which the thermoplastic resin of the surface layer or entirety of the thermosensitive particle softens and deforms, it is possible to detect that the thermistor layer has reached that temperature by sensing that the thermistor layer of the present invention has become highly resistive. Therefore, the thermistor layer of the present invention can be utilized as a thermal sensor.

In addition, since the softening temperature of the thermoplastic resin can be changed by changing the type and molecular weight of the thermoplastic resin contained in the thermistor layer, the temperature at which the thermistor layer becomes highly resistive can be designed and changed with a high degree of freedom. Further, since the softening temperature of the thermoplastic resin is lower than the melting point of the thermoplastic resin, the temperature at which the thermistor layer becomes highly resistive can be set to a relatively low temperature.

Since the thermoplastic resin has the property of softening at a temperature lower than a temperature at which a binder softens, it is possible to prevent the binder from softening and the electro-conductive network formed by the electro-conductive particles from changing at a temperature lower than the temperature at which the thermoplastic resin softens and deforms. Thus, the thermistor layer can have excellent electro-conductive properties at a temperature lower than the softening point of the thermoplastic resin, and can suppress occurrence of power loss in the thermistor layer. When the temperature of the thermistor layer becomes higher than the softening point of the thermoplastic resin, an electrical resistance value of the thermistor layer rapidly increases as described above. As such, the thermistor layer of the present invention has excellent thermistor characteristics.

BRIEF DESCRIPTION OF THE DRAWINGS

FIG. 1 (*a*) is a schematic cross-sectional view of a thermistor including a thermistor layer according to an embodiment of the present invention, and FIG. 1 (*b*) is a schematic top view of a thermosensitive particle covered with a plurality of electro-conductive particles.

FIG. 2 (*a*) is a schematic cross-sectional view of the thermistor after a thermoplastic resin is softened and deformed, and FIG. 2 (*b*) is a schematic top view of a thermosensitive particle covered with a plurality of electro-conductive particles.

FIG. 3 is a schematic cross-sectional view of a thermistor including a thermistor layer according to an embodiment of the present invention.

FIG. 4 (*a*) is a schematic plan view of a positive electrode for a battery including the thermistor layer according to the embodiment of the present invention, and FIG. 4 (*b*) is a schematic cross-sectional view of the positive electrode taken along a dashed line A-A in FIG. 4 (*a*).

FIG. 5 (*a*) is a schematic plan view of a negative electrode for a battery including the thermistor layer according to the embodiment of the present invention, and FIG. 5 (*b*) is a schematic cross-sectional view of the negative electrode taken along a dashed line B-B in FIG. 5 (*a*).

FIG. 6 is a schematic cross-sectional view of a battery including the thermistor layer according to the embodiment of the present invention.

FIG. 7 is a schematic cross-sectional view of a capacitor including the thermistor layer according to the embodiment of the present invention.

DETAILED DESCRIPTION

A thermistor layer according to the present invention is provided so as to be disposed in an electrical current path. The thermistor layer includes a thermosensitive particle, a plurality of electro-conductive particles covering a surface of the thermosensitive particle, and a binder for adhering the plurality of electro-conductive particles. The plurality of electro-conductive particles form an electro-conductive network, at least the surface of the thermosensitive particle is made of a thermoplastic resin, and the thermoplastic resin has the property of softening at a temperature lower than a temperature at which the binder softens. The thermistor layer is provided to become highly resistive due to softening and deformation of the thermoplastic resin.

The plurality of electro-conductive particles preferably form a surface coating layer covering the surface of the thermosensitive particle, and the surface coating layer is a layer in which the electro-conductive network is formed and preferably has a thickness smaller than an average particle diameter of the thermosensitive particles. This can rapidly increase the electrical resistance of the thermistor layer in the vicinity of the softening temperature of the thermoplastic resin, and can improve the thermistor characteristics of the thermistor layer.

The thermosensitive particle is preferably a particle obtained by coating an expanding agent with the thermoplastic resin, a thermally expandable microcapsule, or a thermoplastic resin particle. This can improve the thermistor characteristics of the thermistor layer.

An average particle diameter of the plurality of electro-conductive particles is preferably 20 nm or more and 100 μm or less, and the average particle diameter of the thermosensitive particles is preferably 2 μm or more and 1000 μm or less. This enables the thermistor layer to have excellent thermistor characteristics.

The present invention also provides an electrode for a battery including the thermistor layer of the present invention, a current collector sheet, and an electrode active material layer provided on the current collector sheet. The thermistor layer is disposed between the current collector sheet and the electrode active material layer.

The present invention also provides a battery including the electrode for the battery of the present invention, an electrolyte, and a container for housing the electrode for the battery and the electrolyte.

The present invention also provides a thermistor including the thermistor layer of the present invention, a first electro-conductive layer, and a second electro-conductive layer. The thermistor layer is disposed such that a current flows from the first electro-conductive layer to the second electro-conductive layer via the thermistor layer or such that a current flows from the second electro-conductive layer to the first electro-conductive layer via the thermistor layer.

In the following, the present invention will be described in more detail with reference to a plurality of embodiments. The configurations shown in the drawings and the following description are examples, and the scope of the present invention is not limited to those shown in the drawings and the following description.

First Embodiment

FIG. 1 (*a*) is a schematic cross-sectional view of a thermistor including the thermistor layer of the present invention, and FIG. 1 (*b*) is a schematic top view of a thermosensitive particle covered with a plurality of electro-conductive particles.

In the present embodiment, a thermistor 10 including a thermistor layer 4 of the present invention will be described.

The thermistor 10 of the present embodiment includes a first electro-conductive layer 2, the thermistor layer 4, and a second electro-conductive layer 3, and is formed such that a current flows from the first electro-conductive layer 2 to the second electro-conductive layer 3 via the thermistor layer 4 or such that a current flows from the second electro-conductive layer 3 to the first electro-conductive layer 2 via the thermistor layer 4. In this manner, the thermistor layer 4 can be disposed in an electrical current path.

The thermistor layer 4 includes a thermosensitive particle 5, a plurality of electro-conductive particles 6 covering a surface of the thermosensitive particle 5, and a binder for adhering the plurality of electro-conductive particles 6. The plurality of electro-conductive particles 6 form an electro-conductive network, at least the surface of the thermosensitive particle 5 is made of a thermoplastic resin, and the thermoplastic resin has the property of softening at a temperature lower than a temperature at which the binder softens. The thermistor layer 4 is provided to become highly resistive due to softening and deformation of the thermoplastic resin.

The thermistor 10 is a thermistor whose electrical resistance increases as the temperature increases. The thermistor 10 may be a thermistor element, or may be a thermistor incorporated into an electrode for a battery, a capacitor, a thermal sensor, a fire alarm, a planar heating element, or the like.

The first electro-conductive layer 2 or the second electro-conductive layer 3 constitutes an electrical current path. The first electro-conductive layer 2 and the second electro-conductive layer 3 can be provided so as not to be in direct contact with each other. The first electro-conductive layer 2 or the second electro-conductive layer 3 may be a metal layer, a semiconductor layer, a carbon layer, or an electro-conductive oxide layer. The first electro-conductive layer 2 or the second electro-conductive layer 3 may be a surface coating layer of the particles or an electro-conductive auxiliary agent. The first electro-conductive layer 2 is, for example, a metal foil (thickness: 5 µm to 5 mm), and serves as a base material of the thermistor 10.

The second electro-conductive layer 3 may be formed by stacking a conductor layer such as a metal foil on the thermistor layer 4. In this case, a paste of the same component as that of the thermistor layer 4 may be applied onto the thermistor layer 4, and then the thermistor layer 4 and the conductor layer may be adhered to each other. The second electro-conductive layer 3 may be formed by laminating a conductor on the thermistor layer 4 by a coating method, a vapor deposition method, or the like.

The thermistor layer 4 is a layer whose electrical resistance increases as the temperature increases. The thermistor layer 4 includes the thermosensitive particle 5, the plurality of electro-conductive particles 6 covering the surface of the thermosensitive particle 5, and the binder for adhering the electro-conductive particles 6. The thermistor layer 4 may contain a foaming agent, a plasticizer, etc.

The thickness of the thermistor layer 4 is, for example, 0.1 µm or more and 300 µm or less. The thermistor layer 4 may have a non-uniform thickness. In this case, the thermistor layer 4 can be provided so that a portion where a thermosensitive particle 5 is present becomes a convex portion, and a portion between two adjacent thermosensitive particles 5 becomes a concave portion. The thermistor layer 4 can be provided so that the thermosensitive particles 5 do not substantially overlap each other. Further, a part of the thermosensitive particles 5 may protrude from the thermistor layer 4.

For example, in the case where the thermistor layer 4 is incorporated into an electrode for a battery (see a second embodiment described later), the thickness of the thermistor layer 4 can be 0.1 µm or more and 10 µm or less. In the case where the thermistor layer 4 is incorporated into a thermistor element, the thickness of the thermistor layer 4 can be 50 µm or more and 300 µm or less.

A porosity of the thermistor layer 4 measured by a mercury intrusion method is preferably 5% or more and 65% or less. If the porosity is too low, the electro-conductive network formed by the electro-conductive particles would be dense, and the increase in resistance would be delayed, which is not preferable. If the porosity is too high, an initial resistance of the thermistor layer would be high, which is not preferable.

The thermosensitive particles 5 has the properties of softening and deforming when a predetermined temperature is exceeded, and at least the surface of the particles is made of a thermoplastic resin. The thermosensitive particles 5 may be particles made of a thermoplastic resin in whole, particles coated with a thermoplastic resin, or capsules made of a thermoplastic resin. For example, the thermosensitive particles 5 contained in the thermistor layer 4 shown in FIG. 1 (*a*) are particles (single material particles) made of a thermoplastic resin in whole, and in the thermosensitive particles 5 contained in the thermistor layer 4 shown in FIG. 3, an expanding agent 7 is coated with an outer skin film 8 of a thermoplastic resin.

The shape of the thermosensitive particles 5 may be, for example, granular, fibrous, plate-like, spherical, porous, cotton-like, aggregate, or massive. The thermosensitive particles 5 may be a single type or a combination of two or more types.

The average particle diameter of the thermosensitive particles 5 contained in the thermistor layer 4 is, for example, 2 µm or more and less than 1000 µm. In a case where the average particle diameter of the thermosensitive particles 5 is less than 2 µm, it is necessary to increase an amount (the number of added parts) of the thermosensitive particles 5 contained in the thermistor layer 4 in order to improve the thermistor characteristics, and this increase in the amount of the thermosensitive particles 5 may increase an electrical resistance value of the thermistor layer 4 at a low temperature. In a case where the average particle diameter of the thermosensitive particles 5 is 1000 µm or more, the thermistor layer 4 may not exhibit excellent thermistor characteristics.

The average particle diameter of the thermosensitive particles 5 may be larger or smaller than an average thickness of the thermistor layer 4. In the case where the average particle diameter of the thermosensitive particles 5 is larger than the average thickness of the thermistor layer 4, unevenness is formed on the surface of the thermistor layer 4, and this unevenness can improve adhesion to the second electro-conductive layer 3.

The thermoplastic resin is a resin which exhibits plasticity by softening without reaction at a temperature higher than a predetermined temperature (for example, softening point) and solidifies when cooled. The thermoplastic resin is, for example, polyolefin, polyethylene, polypropylene, polyvinyl chloride, polystyrene, polyvinylidene chloride, fluororesin, polymethyl methacrylate, polyamide, polyester, polycarbonate, polyphenylene oxide, polyurethane, polyacetal, acrylic resin, or the like. The softening temperature of the thermoplastic resin contained in the thermosensitive particle 5 can be adjusted by changing the type and molecular weight of the thermoplastic resin. Since the softening temperature of the thermoplastic resin is the temperature at which the thermistor layer 4 starts to become highly resistive, a suitable thermoplastic resin is selected so that the thermistor layer 4 has desired thermistor characteristics. The softening point of the thermoplastic resin (the temperature at which the thermoplastic resin softens) is measured according to a measurement method described in JIS K2235, JIS K0129, ASTM D127, or the like.

The thermoplastic resin contained in the thermosensitive particle 5 may be a single type of thermoplastic resin or a mixture of a plurality of types of thermoplastic resins.

The thermoplastic resin contained in the thermosensitive particle 5 may act as a binder.

As the thermoplastic resin contained in the thermosensitive particle 5, a resin that softens at a temperature lower than the temperature at which the binder contained in the thermistor layer 4 softens is selected.

The thermosensitive particle 5 may be a particle that expands when the thermoplastic resin of the surface layer thereof is softened.

For example, the thermosensitive particle 5 is a particle in which a heat decomposition type chemical foaming agent (expanding agent 7) is coated with the outer skin film 8 of the thermoplastic resin. The heat decomposition type chemical foaming agent is a substance that is chemically decomposed by heat to produce a gas. Examples of the heat decomposition type chemical foaming agent include dinitrosopentamethylenetetramine (DPT), azodicarbonamide (ADCA), p-p'-oxybisbenzenesulfonylhydrazide (OBSH), inorganic foaming agents (including sodium hydrogen carbonate), composite foaming agents, or the like.

The thermoplastic resin and the heat decomposition type chemical foaming agent in the thermosensitive particle 5 can be combined so that a temperature at which a gas is generated from the heat decomposition type chemical foaming agent is lower than the temperature at which the thermoplastic resin softens. When the temperature of such a thermosensitive particle 5 increases to the temperature at which a gas is generated from the heat decomposition type chemical foaming agent, the gas is generated inside the thermosensitive particle 5. However, since the foaming agent is coated with the thermoplastic resin, an internal pressure of the thermosensitive particle 5 is increased, but the shape of the thermosensitive particle 5 is almost unchanged. When the temperature of the thermosensitive particle 5 further increases to the temperature at which the thermoplastic resin softens, the thermosensitive particle 5 expands due to the internal pressure.

The thickness of the outer skin film 8 made of the thermoplastic resin of the thermosensitive particle 5 can be, for example, 0.05 μm or more and 40 μm or less.

The thermosensitive particles 5 are, for example, thermally expandable microcapsules. The thermally expandable microcapsule is obtained by encapsulating a volatile organic solvent (expanding agent 7) such as isobutane, pentane, petroleum ether, hexane, heptane, a low-boiling halogenated hydrocarbon, or methylsilane in a thermoplastic resin capsule (outer skin film 8). The expanding agent is preferably of a hydrocarbon-based.

As the temperature of such a thermosensitive particle 5 increases and the volatile organic solvent is volatilized or vaporized, the internal pressure of the thermosensitive particle 5 increases. As the temperature of the thermosensitive particle 5 further increases to the temperature at which the thermoplastic resin softens, the thermosensitive particle 5 expands due to the internal pressure. The thickness of the capsule shell (outer skin film 8) made of the thermoplastic resin can be, for example, 0.05 μm or more and 40 μm or less.

The thermosensitive particle 5 may be a porous or cotton-like body containing a spherical body or a massive body inside or having a fibrous material attached to its surface (core-shell structure).

The electro-conductive particles 6 are not particularly limited as long as they have conductivity, and are, for example, carbon particles (hard carbon, soft carbon, graphite, carbon black), metal particles, electro-conductive glass particles, oxide conductor particles (for example, ITO particles), or the like.

The average particle diameter of the electro-conductive particles 6 can be 20 nm or more and 100 μm or less. In a case where the average particle diameter of the electro-conductive particles 6 is less than 20 nm, the increase in electrical resistance may be small even if the thermosensitive particle 5 is softened and the shape thereof is changed, and in a case where the average particle diameter is greater than 100 μm, the electrical resistance of the thermistor layer 4 at low temperatures may be high in the number of added parts where the effect at high temperatures (excellent thermistor characteristics) is obtained.

The electro-conductive particles 6 are provided so as to cover the surface of the thermosensitive particle 5. The thermistor layer 4 contains the electro-conductive particles 6 in such an amount that the electro-conductive particles 6 can cover the surfaces of the thermosensitive particles 5. The entire surface of the thermosensitive particle 5 may be covered with the electro-conductive particles 6, or a part of the surface of the thermosensitive particle 5 may be covered with the electro-conductive particles 6. In the case where a part of the thermosensitive particle 5 protrudes from the thermistor layer 4, the surface of the thermosensitive particle 5 is covered with the electro-conductive particles 6 at least within the thermistor layer 4.

The average particle diameter of the thermosensitive particles 5 can be 0.1 to 10,000 times the average particle diameter of the electro-conductive particles 6.

The amount of the thermosensitive particles 5 contained in the thermistor layer 4 is preferably 5 parts by mass or more and 1000 parts by mass or less with respect to 100 parts by mass of the electro-conductive particles 6 (the ratio of electro-conductive particles to thermosensitive particles=1: 0.05 to 10). This mixing ratio varies depending on the device into which the thermistor layer 4 is incorporated.

In the case where the thermistor layer 4 is incorporated into an electrode for a battery (see the second embodiment), the amount of the thermosensitive particles 5 contained in the thermistor layer 4 is preferably 5 parts by mass or more and 300 parts by mass or less with respect to 100 parts by mass of the electro-conductive particles 6 (the ratio of electro-conductive particles to thermosensitive particles=1: 0.05 to 3).

In the case where the thermistor layer 4 is incorporated into a planar heating element, the amount of the thermosensitive particles 5 contained in the thermistor layer 4 is preferably 5 parts by mass or more and 1000 parts by mass or less with respect to 100 parts by mass of the electro-conductive particles 6 (the ratio of electro-conductive particles to thermosensitive particles=1:0.05 to 10).

In a case where the amount of the thermosensitive particles 5 contained in the thermistor layer 4 is 5 parts by mass or less with respect to 100 parts by mass of the electro-conductive particles 6, the increase in electrical resistance of the thermistor layer 4 when the thermoplastic resin is softened and deformed may be small, and the thermistor layer 4 may not exhibit excellent thermistor characteristics. In a case where the amount of the thermosensitive particles 5 contained in the thermistor layer 4 is 1000 parts by mass or more with respect to 100 parts by mass of the electro-conductive particles 6, the electrical resistance of the thermistor layer 4 increases, and power loss in the electrical current path may occur in the thermistor layer 4.

The binder contained in the thermistor layer 4 is a binder for adhering the plurality of electro-conductive particles 6. The binder is, for example, polyolefin, PVP (polyvinyl pyrrolidone), acrylic resin, CMC (carboxymethyl cellulose), SBR (styrene butadiene rubber), or the like. The binder may adhere the electro-conductive particles 6 to the thermosensitive particles 5. The binder may also adhere the thermistor layer 4 to the first electro-conductive layer 2.

By adhering the plurality of electro-conductive particles 6 with such a binder, a porous body of the electro-conductive particles 6 can be formed in the thermistor layer 4, and an electro-conductive network of the electro-conductive particles 6 can be formed. This enables the thermistor layer 4 to have high conductivity.

An amount of the binder contained in the thermistor layer 4 is preferably 20 parts by mass or more and 1000 parts by mass or less with respect to 100 parts by mass of a total of the thermosensitive particles 5 and the electro-conductive particles 6. As a result, the electro-conductive particles 6 contained in the thermistor layer 4 can be adhered to form the electro-conductive network. This binder amount can be appropriately changed according to the device into which the thermistor layer 4 is incorporated. In a case where the amount of the binder is less than 20 parts by mass, the adhesion between the thermistor layer 4 and the base material would be poor, and in a case where the amount of the binder is more than 1000 parts by mass, the initial resistance of the thermistor layer 4 would be too high.

As the binder contained in the thermistor layer 4, a binder that does not soften at a temperature lower than the softening temperature of the thermoplastic resin contained in the thermosensitive particles 5 is selected. This can suppress the electro-conductive network of the electro-conductive particles 6 from being broken at a temperature lower than the softening temperature of the thermoplastic resin, and the thermistor layer 4 can have high conductivity. Therefore, the power loss in the electrical current path via the thermistor layer 4 between the first electro-conductive layer 2 and the second electro-conductive layer 3 can be reduced.

In addition, since the softening temperature of the thermoplastic resin is lower than the softening temperature of the binder, the thermoplastic resin (thermosensitive particles 5) starts to soften before the binder, and the electro-conductive network formed by the contact of the electro-conductive particles 6 of the thermistor layer 4 is broken by the deformation of the thermosensitive particles 5 due to the softening of the thermoplastic resin. This makes it possible to rapidly increase the electrical resistance of the thermistor layer 4 in the vicinity of the softening temperature of the thermoplastic resin.

A combination of the thermoplastic resin (thermosensitive particles 5) and the binder contained in the thermistor layer 4 can be appropriately selected so that the thermistor layer 4 operates (becomes highly resistive) at a desired temperature.

The softening temperature of the thermoplastic resin is preferably at least 50° C. lower than the softening temperature of the binder.

For example, in a case where the thermistor layer 4 is incorporated into an electrode for a battery of a lithium ion battery (see the second embodiment), since a temperature at which a shutdown function of a separator operates is approx. 180° C., the thermoplastic resin contained in the thermosensitive particles 5 can be selected so that the softening temperature of the thermoplastic resin is 130° C. to 150° C. As the binder contained in the thermistor layer 4, a binder which softens at 200° C. to 220° C. can be selected.

In a case where the thermistor layer 4 is incorporated into a planar heating element or a thermal sensor for a fire alarm, since a desired operating temperature of the thermistor layer 4 is 70° C. to 150° C., the thermoplastic resin contained in the thermosensitive particles 5 can be selected so that the softening temperature of the thermoplastic resin is 50° C. to 130° C. As the binder contained in the thermistor layer 4, a binder which softens at 100° C. to 200° C. can be selected.

In a case where the temperature of the thermistor layer 4 is lower than the softening temperature of the thermoplastic resin of the thermosensitive particles 5, as shown in FIG. 1 (*a*), for example, the surfaces of the thermosensitive particles 5 are covered with the electro-conductive particles 6, and the plurality of electro-conductive particles 6 form an electro-conductive network. Also, on the surface of the thermosensitive particle 5, the plurality of electro-conductive particles 6 form an electro-conductive network, as shown in FIG. 1 (*b*).

The electro-conductive particles 6 contained in the thermistor layer 4 can form a surface coating layer 11 covering the surfaces of the thermosensitive particles 5. The surface coating layer 11 is a layer formed of a plurality of electro-conductive particles 6 forming an electro-conductive network, and can have a thickness smaller than the average particle diameter of the thermosensitive particles 5. The surface coating layer 11 can have a shape along the surface of the thermosensitive particles 5, and an outer surface of the surface coating layer 11 can be provided so as to be in contact with the second electro-conductive layer 3. By the electro-conductive particles 6 forming such a surface coating layer 11, the electro-conductive network of the electro-conductive particles 6 is easily broken when the thermosensitive particles 5 are softened and deformed, rendering the thermistor layer 4 highly resistive.

As the temperature of the thermistor layer 4 becomes higher than the softening temperature of the thermoplastic resin of the thermosensitive particles 5, as shown in FIG. 2 (*a*), the thermosensitive particles 5 are softened and deformed, and the thermoplastic resin enters gaps or voids between the particles, or the thermosensitive particles 5 are dented and voids 9 are generated. When the thermosensitive particle 5 is deformed, as shown in FIG. 2 (*b*), the electro-conductive network of the electro-conductive particles 6 on the surface of the thermosensitive particle 5 is broken. As a result, the thermistor layer 4 becomes highly resistive, and the current flowing in the electrical current path via the thermistor layer 4 between the first electro-conductive layer 2 and the second electro-conductive layer 3 is reduced.

As in the thermistor 10 shown in FIG. 3, in a case where the thermosensitive particles 5 contained in the thermistor layer 4 are particles that expand when the thermoplastic resin (outer skin film 8) of the surface layer thereof softens, when the temperature of the thermistor layer 4 becomes higher than the softening temperature of the thermoplastic resin of the thermosensitive particles 5, the outer skin film 8 of the thermoplastic resin expands due to the internal pressure of the thermosensitive particles 5 and enters the gaps or voids between the particles. The thermoplastic resin that enters between adjacent electro-conductive particles 6 breaks the electro-conductive contact between the electro-conductive particles 6 and breaks the electro-conductive network of the electro-conductive particles 6. The electro-conductive network of the electro-conductive particles 6 on the surface of the thermosensitive particle 5 is also broken. As a result, the thermistor layer 4 becomes highly resistive, and the current flowing in the electrical current path via the thermistor layer 4 between the first electro-conductive layer 2 and the second electro-conductive layer 3 is reduced.

The thermistor layer 4 may contain a heat decomposition type chemical foaming agent separately from the thermosensitive particles 5. In this case, when the temperature of the thermistor layer 4 increases to a temperature at which a gas is generated from the heat decomposition type chemical foaming agent, the thermistor layer 4 is expanded by the gas generated from the foaming agent, and a void is generated inside the thermistor layer 4. When the temperature of the thermistor layer 4 further increases to the temperature at which the thermoplastic resin softens, the softened thermoplastic resin of the thermosensitive particles 5 flows into the void, and the electro-conductive network is broken. This can render the thermistor layer 4 highly resistive.

The thermistor layer 4 can be formed, for example, as follows.

After the electro-conductive particles 6, a binder, and a dispersant are dispersed in a solvent, the thermosensitive particles 5 are added to this slurry. Thereafter, the viscosity and solid content of the slurry are adjusted to prepare a slurry for coating. The slurry for coating is applied onto the first electro-conductive layer 2, and the coated film is dried to form the thermistor layer 4.

Second Embodiment

The second embodiment relates to an electrode for a battery (a positive electrode for a battery or a negative electrode for a battery) in which the thermistor layer 4 of the present invention is incorporated, and a battery in which this electrode for the battery is incorporated. FIG. 4 (*a*) is a schematic plan view of the positive electrode for the battery, and FIG. 4 (*b*) is a schematic cross-sectional view of the positive electrode for the battery taken along a dashed line A-A in FIG. 4 (*a*). FIG. 5 (*a*) is a schematic plan view of the negative electrode for the battery, and FIG. 5 (*b*) is a schematic cross-sectional view of the negative electrode for the battery taken along a dashed line B-B in FIG. 5 (*a*). FIG. 6 is a schematic cross-sectional view of a battery in which the positive electrode for the battery shown in FIGS. 4 (*a*) and 4 (*b*) and the negative electrode for the battery shown in FIGS. 5 (*a*) and 5 (*b*) are incorporated. In FIG. 6, the thermistor layer 4 is omitted.

A battery 30 is not particularly limited as long as it has a possibility of thermal runaway, but is, for example, a non-aqueous electrolyte secondary battery (for example, a lithium ion secondary battery).

The thermistor layer 4 is the same as in the first embodiment. A thermoplastic resin contained in the thermistor layer 4 is selected so that the thermistor layer 4 can prevent thermal runaway of the battery 30 without hindering normal charge and discharge of the battery 30. For example, in a lithium ion secondary battery, a thermoplastic resin can be selected so that the thermistor layer 4 becomes highly resistive at 130° C. to 150° C.

In a positive electrode 18 for a battery, the thermistor layer 4 is disposed between a positive electrode current collector sheet 13 and a positive electrode active material layer 15. The thermistor layer 4 can be provided to coat the positive electrode current collector sheet 13. The thermistor layer 4 can be provided so that the positive electrode current collector sheet 13 and the positive electrode active material layer 15 are not in contact with each other. As a result, in a case where the battery 30 generates abnormal heat due to overcharging, internal short-circuiting or the like, the thermistor layer 4 can be rendered highly resistive, and the current flowing between the positive electrode current collector sheet 13 and the positive electrode active material layer 15 can be reduced by this highly resistive thermistor layer 4. This can prevent the battery 30 from thermal runaway.

The positive electrode current collector sheet 13 corresponds to the first electro-conductive layer 2 of the first embodiment, and the positive electrode active material layer 15 (or an electro-conductive film or an electro-conductive auxiliary agent contained in the positive electrode active material layer 15) corresponds to the second electro-conductive layer 3 of the first embodiment.

In a negative electrode 19 for a battery, the thermistor layer 4 is disposed between a negative electrode current collector sheet 14 and a negative electrode active material layer 16. The thermistor layer 4 can be provided to coat the negative electrode current collector sheet 14. The thermistor layer 4 can be provided so that the negative electrode current collector sheet 14 and the negative electrode active material layer 16 are not in contact with each other. As a result, in a case where the battery 30 generates abnormal heat due to overcharging, internal short-circuiting or the like, the thermistor layer 4 can be rendered highly resistive, and the current flowing between the negative electrode current collector sheet 14 and the negative electrode active material layer 16 can be reduced by this highly resistive thermistor layer 4. This can prevent the battery 30 from thermal runaway.

The negative electrode current collector sheet 14 corresponds to the first electro-conductive layer 2 of the first embodiment, and the negative electrode active material layer 16 corresponds to the second electro-conductive layer 3 of the first embodiment.

In the battery 30 shown in FIG. 6, the thermistor layer 4 is provided on both of the positive electrode 18 for the battery and the negative electrode 19 for the battery, but the thermistor layer 4 may be provided on only either one of the positive electrode 18 for the battery and the negative electrode 19 for the battery.

Third Embodiment

A third embodiment relates to an aluminum electrolytic capacitor incorporating the thermistor layer 4 of the present invention. FIG. 7 is a schematic cross-sectional view of a capacitor 50 of the present embodiment.

The aluminum electrolytic capacitor 50 uses an oxide film 43 formed on a surface of an anode aluminum electrode 41 as a dielectric layer. Since this oxide film 43 is very thin, the aluminum electrolytic capacitor 50 has a large capacity. However, in a case where the oxide film 43 is destroyed by an electrochemical reaction, a conventional aluminum electrolytic capacitor becomes unusable and may burst and smoke.

In the capacitor 50 of the present embodiment, the thermistor layer 4 is provided between the anode aluminum electrode 41 and an anode lead 48. The thermistor layer 4 is also provided between a cathode aluminum electrode 42 and a cathode lead 49. The thermistor layer 4 is the same as in the first embodiment. The thermoplastic resin contained in the thermistor layer 4 is selected so as to prevent the explosion and smoke generation of the capacitor 50 without the thermistor layer 4 interfering with a normal operation of the capacitor 50.

In a case where the oxide film 43 of the capacitor 50 is destroyed by the electrochemical reaction, the capacitor 50 may generate abnormal heat. This abnormal heat generation can render the thermistor layer 4 highly resistive, and this highly resistive thermistor layer 4 can reduce a current flowing between the anode aluminum electrode 41 and the anode lead 48 and a current flowing between the cathode aluminum electrode 42 and the cathode lead 49. This can prevent the capacitor 50 from bursting and smoking.

The anode lead 48 or the cathode lead 49 corresponds to the first electro-conductive layer 2 of the first embodiment, and the anode aluminum electrode 41 or the cathode aluminum electrode 42 corresponds to the second electro-conductive layer 3 of the first embodiment.

Electrical Resistivity Measurement

The following Samples 1 to 9 were prepared.

(Sample 1)

10 parts by mass of high-purity graphite particles (UP-5α (average particle diameter: approx. 5.5 µm) manufactured by Nippon Graphite Industries Co., Ltd.) (electro-conductive particles) and 5 parts by mass of a water-soluble acrylic resin (binder) were put into 100 parts by mass of ion-exchange water and mixed to prepare a uniform slurry. To this slurry, 5 parts by mass of spherical polyolefin A (average particle diameter: approx. 7 µm, softening point: approx. 135° C., commercial product) (thermosensitive particles) was added and uniformly dispersed to prepare a coating paste. A softening point of the water-soluble acrylic resin was approx. 205° C.

The prepared coating paste was applied using a gravure coating machine and dried to form a thermistor layer having a thickness of approx. 3 μm on an aluminum foil (thickness: approx. 15 μm) (first electro-conductive layer).

A paste for a positive electrode active material layer containing lithium iron phosphate particles (90 parts by mass) coated with a carbon film, acetylene black (electro-conductive agent) (3 parts by mass), and PVDF (polyvinylidene fluoride) (7 parts by mass) was prepared. This paste for the positive electrode active material layer was applied onto the thermistor layer and dried to form a positive electrode active material layer (thickness: approx. 50 μm) (second electro-conductive layer).

Using a roller press machine, a laminate (thermistor 10) of the aluminum foil, the thermistor layer, and the second electro-conductive layer was compressed to a thickness of approx. 50 μm. After that, the compressed thermistor 10 was left in a dryer at 80° C. for 5 minutes, and then left in a desiccator at room temperature for 10 minutes. Thereafter, a test piece having a diameter of 15 mm was punched out from the thermistor 10 to prepare Sample 1.

(Sample 2)

Sample 2 was prepared by the same method as that of Sample 1 except that both 3 parts by mass of spherical polyolefin A (average particle diameter: approx. 7 μm, softening point: approx. 135° C., commercial product) and 2 parts by mass of thermally expandable microcapsules (average particle diameter: 20 μm, foaming start temperature: 135° C., commercial product) were used as the thermosensitive particles.

(Sample 3)

Sample 3 was prepared by the same method as that of Sample 1 except that 5 parts by mass of spherical polyolefin B (average particle diameter: 4.5 μm, softening point: 115° C., commercial product) was used as the thermosensitive particles.

(Sample 4)

Sample 4 was prepared by the same method as that of Sample 2 except that CMC (carboxymethyl cellulose) was used as the binder.

(Sample 5)

Sample 5 was prepared by the same method as that of Sample 1 except that the thermosensitive particles were not added.

(Sample 6)

Sample 6 was prepared by the same method as that of Sample 1 except that 35 parts by mass of spherical polyolefin A (average particle diameter: 7 μm, softening point: 135° C.) was used as the thermosensitive particles.

(Sample 7)

Sample 7 was prepared by the same method as that of Sample 1 except that 5 parts by mass of fibrous polyolefin (average length: 1000 μm, commercial product) was used as the thermosensitive particles.

(Sample 8)

Sample 8 was prepared by the same method as that of Sample 1 except that a stainless steel foil having a thickness of 10 μm was used as the second electro-conductive layer 3 of the thermistor 10, and the laminate of the aluminum foil, the thermistor layer, and the second electro-conductive layer was made to have a thickness of 30 μm by a roll press machine.

(Sample 9)

Sample 9 was prepared by the same method as that of Sample 1 except that a paste containing silica particles (85 parts by mass), high-purity graphite particles, acetylene black (electro-conductive agent) (5 parts by mass), and SBR (styrene butadiene rubber) (10 parts by mass) was prepared and this paste was applied onto the thermistor layer and dried to form the second electro-conductive layer.

(Heat Treatment)

After completing resistivity measurement to be described later for Samples 1 to 9, Samples 1 to 9 were left in a dryer at 180° C. for 2 hours.

(Resistivity Measurement)

Each of Samples 1, 2, 3, 4, 5, 6, 7, 8, and 9 before the heat treatment and Samples 1, 2, 3, 4, 5, 6, 7, 8, and 9 after the heat treatment was sandwiched between two gold-plated copper cylinders (diameter: 11.3 mm), and electrical resistivity of each of Samples 1 to 9 before the heat treatment and Samples 1 to 9 after the heat treatment was measured in a state in which a pressure of 0.98 MPa was applied. Measurement results are shown in Table 1.

TABLE 1

| | Thermosensitive particles | Number of added parts of thermosensitive particles | Average particle diameter of thermosensitive particles | Binder (number of added parts) | Second electro-conductive layer | Electrical resistivity before heat treatment | Electrical resistivity after heat treatment |
|---|---|---|---|---|---|---|---|
| Sample 1 | Spherical polyolefin A Softening point: approx. 135° C. | 5 pts. mass | 7 μm | Acrylic resin (5 pts. mass) | Positive electrode active material layer | 182 Ω · cm | 576 Ω · cm |
| Sample 2 | Spherical polyolefin A Softening point: approx. 135° C. | 3 pts. mass | 7 μm | Acrylic resin (5 pts. mass) | Positive electrode active material layer | 221 Ω · cm | 585 Ω · cm |
| | Thermally expandable microcapsules Foaming start temperature: 135° C. | 2 pts. mass | 20 μm | | | | |
| Sample 3 | Spherical polyolefin B Softening point: approx. 115° C. | 5 pts. mass | 4.5 μm | Acrylic resin (5 pts. mass) | Positive electrode active material layer | 324 Ω · cm | 647 Ω · cm |
| Sample 4 | Spherical polyolefin A Softening point: approx. 135° C. | 3 pts. mass | 7 μm | CMC (5 pts. mass) | Positive electrode active material layer | 545 Ω · cm | 905 Ω · cm |
| | Thermally expandable microcapsules Foaming start temperature: 135° C. | 2 pts. mass | 20 μm | | | | |

TABLE 1-continued

|  | Thermosensitive particles | Number of added parts of thermosensitive particles | Average particle diameter of thermosensitive particles | Binder (number of added parts) | Second electro-conductive layer | Electrical resistivity before heat treatment | Electrical resistivity after heat treatment |
| --- | --- | --- | --- | --- | --- | --- | --- |
| Sample 5 | None | — | — | Acrylic resin (5 pts. mass) | Positive electrode active material layer | 159 Ω · cm | 162 Ω · cm |
| Sample 6 | Spherical polyolefin A Softening point: approx. 135° C. | 35 pts. mass | 7 μm | Acrylic resin (5 pts. mass) | Positive electrode active material layer | 554 Ω · cm | 715 Ω · cm |
| Sample 7 | Fibrous polyolefin D Softening point: approx. 140° C. | 5 pts. mass | Average length 1000 μm | Acrylic resin (5 pts. mass) | Positive electrode active material layer | 259 Ω · cm | 295 Ω · cm |
| Sample 8 | Spherical polyolefin A Softening point: approx. 135° C. | 5 pts. mass | 7 μm | Acrylic resin (5 pts. mass) | Stainless steel foil | 351 Ω · cm | 1085 Ω · cm |
| Sample 9 | Spherical polyolefin A Softening point: approx. 135° C. | 5 pts. mass | 7 μm | Acrylic resin (5 pts. mass) | Silica-electro-conductive agent-SBR | 231 Ω · cm | 568 Ω · cm |

In the samples (Samples 1 to 4 and 6 to 9) to which the thermosensitive particles were added, the electrical resistivity of the samples after the heat treatment was higher than that of the samples before the heat treatment. Thus, it was confirmed that the thermistor layer became highly resistive due to softening and deformation of the thermosensitive particles. Further, in Samples 1, 2, 3, 8, and 9, it was confirmed that the electrical resistivity of the samples after the heat treatment was 300 Ω·cm or more higher than that of the samples before the heat treatment.

Battery Nailing Experiment (Production of Lithium Ion Battery)

10 parts by mass of high-purity graphite particles (UP-5α (average particle diameter: approx. 5.5 μm) manufactured by Nippon Graphite Industries Co., Ltd.) (electro-conductive particles) and 5 parts by mass of a water-soluble acrylic resin (binder) were put into 100 parts by mass of ion-exchange water and mixed to prepare a uniform slurry. To this slurry, 10 parts by mass of spherical polyolefin particles (average particle diameter: approx. 7 μm, softening point: approx. 135° C., commercial product) (thermosensitive particles) were added and uniformly dispersed to prepare a coating paste. A softening point of the water-soluble acrylic resin was approx. 205° C.

The coating paste prepared was applied using a gravure coating machine and dried to form a thermistor layer having a thickness of approx. 3 μm on each of two surfaces of an aluminum foil (thickness: approx. 15 μm).

A paste for a positive electrode active material layer containing lithium iron phosphate particles (90 parts by mass) coated with a carbon film, acetylene black (electro-conductive agent) (3 parts by mass), and PVDF (polyvinylidene fluoride) (7 parts by mass) was prepared. This paste for the positive electrode active material layer was applied onto the thermistor layers on both sides of the aluminum foil and dried to form a positive electrode active material layer (thickness: approx. 20 μm). In this manner, a positive electrode of the example was produced.

A positive electrode of a comparative example was also produced by the same method except that the thermistor layer was not provided.

A paste for a negative electrode active material layer containing amorphous carbon as a negative electrode active material and PVDF as a binder was prepared, and this paste for the negative electrode active material layer was applied onto both surfaces of a copper foil and dried to form a negative electrode active material layer. In this manner, a negative electrode was produced.

A plurality of positive electrodes of the example and a plurality of negative electrodes were alternately stacked with a separator interposed therebetween, and were fixed with a tape to produce an electrode laminate. This electrode laminate was inserted into a square aluminum case, electro-conductive connections were made to the positive electrodes and the negative electrodes, an electrolytic solution was injected, and a lid was put on the case to produce a lithium ion battery of the example. The electrolytic solution used was a mixture of 70 parts by mass of ethylene carbonate and 30 parts by mass of diethyl carbonate in which lithium hexafluorophosphate was dissolved as a supporting electrolyte. The lid is provided with a safety valve.

Further, a lithium ion battery of the comparative example was produced by the same method as that of the lithium ion battery of the example except that the positive electrode of the comparative example was used.

(Nailing Test)

After charging (CCCV charging) the lithium ion battery of the example or the lithium ion battery of the comparative example at a current of 30 A and a voltage of 3.60 V for 4 hours, a thermocouple was attached to the square aluminum case, and a nail having a diameter of 5 mm was inserted into a side surface of the square aluminum case to penetrate the battery, thereby forcibly generating an internal short circuit. A temperature rise of the aluminum case due to heat generated by this internal short circuit was monitored using the thermocouple. In addition, opening and closing of the safety valve of the lid and the presence or absence of smoke generation were observed. Measurement results are shown in Table 2.

TABLE 2

|  | Discharge capacity (Ah) | Maximum temperature (° C.) | Safety valve | Smoke generation |
| --- | --- | --- | --- | --- |
| Example | 30 | 94.7 | Close | Absent |
| Comparative example | 30 | 147.7 | Open | Present |

In the lithium ion battery of the example, the maximum temperature was 94.7° C., the safety valve did not open, and no smoke generation was observed. On the other hand, in the lithium ion battery of the comparative example, the maximum temperature reached 147.7° C., the safety valve was opened, and smoke generation was also observed.

From this result, it was confirmed that the thermistor layer of the positive electrode became highly resistive due to the heat generation caused by the internal short circuit and suppressed heat generation caused by a short circuit current.

REFERENCE SIGNS LIST

2: first electro-conductive layer, 3: second electro-conductive layer, 4: thermistor layer, 5: thermosensitive particle, 6: electro-conductive particle, 7: expanding agent, 8: outer skin film, 9: void, 10: thermistor, 11: surface coating layer, 13: positive electrode current collector sheet, 14: negative electrode current collector sheet, 15: positive electrode active material layer, 16: negative electrode active material layer, 18: positive electrode for battery, 19: negative electrode for battery, 22: separator, 23: electrolyte, 24: container, 26: positive electrode terminal, 27: negative electrode terminal, 30: battery, 41: anode aluminum electrode, 42: cathode aluminum electrode, 43: oxide film, 45: electrolytic solution, 46: electrolytic paper, 48: anode lead, 49: cathode lead, 50: aluminum electrolytic capacitor

What is claimed is:

1. A thermistor layer configured to be disposed in an electrical current path, wherein
the thermistor layer comprises thermosensitive particles, a plurality of electro-conductive particles covering a surface of each of the thermosensitive particles, and a binder adhering the electro-conductive particles,
the electro-conductive particles form an electro-conductive network,
an average particle diameter of the thermosensitive particles is larger than an average thickness of the thermistor layer,
at least the surface of each of the thermosensitive particles is made of a thermoplastic resin,
the thermoplastic resin has the property of softening at a temperature lower than a temperature at which the binder softens, and
the thermistor layer is provided to become highly resistive due to softening and deformation of the thermoplastic resin.

2. The thermistor layer according to claim 1, wherein
the electro-conductive particles form a surface coating layer covering the surface of each of the thermosensitive particles, and
the surface coating layer is a layer in which the electro-conductive network is formed and has a thickness smaller than the average particle diameter of the thermosensitive particles.

3. An electrode for a battery, the electrode comprising the thermistor layer according to claim 2, a current collector sheet, and an electrode active material layer provided on the current collector sheet,
wherein the thermistor layer is disposed between the current collector sheet and the electrode active material layer.

4. A thermistor comprising the thermistor layer according to claim 2, a first electro-conductive layer, and a second electro-conductive layer,
wherein the thermistor layer is disposed such that a current flows from the first electro-conductive layer to the second electro-conductive layer via the thermistor layer or such that a current flows from the second electro-conductive layer to the first electro-conductive layer via the thermistor layer.

5. The thermistor layer according to claim 2, wherein each of the thermosensitive particles is an expanding agent coated with the thermoplastic resin, a thermally expandable microcapsule, or a thermoplastic resin particle.

6. The thermistor layer according to claim 5, wherein
an average particle diameter of the electro-conductive particles is 20 nm or more and 100 μm or less, and
an average particle diameter of the thermosensitive particles is 2 μm or more and 1000 μm or less.

7. An electrode for a battery, the electrode comprising the thermistor layer according to claim 6, a current collector sheet, and an electrode active material layer provided on the current collector sheet,
wherein the thermistor layer is disposed between the current collector sheet and the electrode active material layer.

8. A battery comprising the electrode for the battery according to claim 7, an electrolyte, and a container for housing the electrode for the battery and the electrolyte.

9. A thermistor comprising the thermistor layer according to claim 6, a first electro-conductive layer, and a second electro-conductive layer,
wherein the thermistor layer is disposed such that a current flows from the first electro-conductive layer to the second electro-conductive layer via the thermistor layer or such that a current flows from the second electro-conductive layer to the first electro-conductive layer via the thermistor layer.

10. An electrode for a battery, the electrode comprising the thermistor layer according to claim 5, a current collector sheet, and an electrode active material layer provided on the current collector sheet,
wherein the thermistor layer is disposed between the current collector sheet and the electrode active material layer.

11. The thermistor layer according to claim 2, wherein
an average particle diameter of the electro-conductive particles is 20 nm or more and 100 μm or less, and
an average particle diameter of the thermosensitive particles is 2 μm or more and 1000 μm or less.

12. An electrode for a battery, the electrode comprising the thermistor layer according to claim 11, a current collector sheet, and an electrode active material layer provided on the current collector sheet,
wherein the thermistor layer is disposed between the current collector sheet and the electrode active material layer.

13. The thermistor layer according to claim 1, wherein each of the thermosensitive particles is an expanding agent coated with the thermoplastic resin, a thermally expandable microcapsule, or a thermoplastic resin particle.

14. The thermistor layer according to claim 13, wherein
an average particle diameter of the electro-conductive particles is 20 nm or more and 100 μm or less, and
an average particle diameter of the thermosensitive particles is 2 μm or more and 1000 μm or less.

15. An electrode for a battery, the electrode comprising the thermistor layer according to claim 14, a current collector sheet, and an electrode active material layer provided on the current collector sheet,
wherein the thermistor layer is disposed between the current collector sheet and the electrode active material layer.

16. An electrode for a battery, the electrode comprising the thermistor layer according to claim 13, a current collector sheet, and an electrode active material layer provided on the current collector sheet, wherein the thermistor layer is disposed between the current collector sheet and the electrode active material layer.

17. A thermistor comprising the thermistor layer according to claim 13, a first electro-conductive layer, and a second electro-conductive layer, wherein the thermistor layer is disposed such that a current flows from the first electro-conductive layer to the second electro-conductive layer via the thermistor layer or such that a current flows from the second electro-conductive layer to the first electro-conductive layer via the thermistor layer.

18. The thermistor layer according to claim 1, wherein an average particle diameter of the electro-conductive particles is 20 nm or more and 100 μm or less, and an average particle diameter of the thermosensitive particles is 2 μm or more and 1000 μm or less.

19. An electrode for a battery, the electrode comprising the thermistor layer according to claim 18, a current collector sheet, and an electrode active material layer provided on the current collector sheet, wherein the thermistor layer is disposed between the current collector sheet and the electrode active material layer.

20. A thermistor comprising the thermistor layer according to claim 18, a first electro-conductive layer, and a second electro-conductive layer, wherein the thermistor layer is disposed such that a current flows from the first electro-conductive layer to the second electro-conductive layer via the thermistor layer or such that a current flows from the second electro-conductive layer to the first electro-conductive layer via the thermistor layer.

* * * * *